(12) United States Patent
Meier

(10) Patent No.: US 10,247,348 B2
(45) Date of Patent: Apr. 2, 2019

(54) LINING DEVICE FOR LINING A SEWER BRANCH PIPE

(71) Applicant: Verica Meier, Fürth (DE)

(72) Inventor: Dieter Meier, Fürth (DE)

(73) Assignee: Verica Meier, Fürth (DE)

( * ) Notice: Subject to any disclaimer, the term of this patent is extended or adjusted under 35 U.S.C. 154(b) by 20 days.

(21) Appl. No.: 15/598,612

(22) Filed: May 18, 2017

(65) Prior Publication Data

US 2017/0343147 A1    Nov. 30, 2017

(30) Foreign Application Priority Data

May 27, 2016  (DE) .................. 10 2016 209 246

(51) Int. Cl.
*F16L 55/18*   (2006.01)
*F16L 55/165*  (2006.01)

(52) U.S. Cl.
CPC ....... *F16L 55/1654* (2013.01); *F16L 55/1651* (2013.01)

(58) Field of Classification Search
CPC . F16L 55/1654; F16L 55/1608; F16L 55/179; F16L 55/1651
USPC .............. 138/98, 97; 156/287; 405/184.2
See application file for complete search history.

(56) References Cited

U.S. PATENT DOCUMENTS

| | | | | |
|---|---|---|---|---|
| 5,674,030 A | * | 10/1997 | Sigel | F16L 55/1654 138/97 |
| 6,484,757 B1 | * | 11/2002 | Warren | F16L 55/179 138/97 |
| 6,695,013 B2 | * | 2/2004 | Warren | F16L 55/179 138/93 |
| 2003/0178078 A1 | | 9/2003 | Warren | |

FOREIGN PATENT DOCUMENTS

| | | |
|---|---|---|
| DE | 699 16 681 T2 | 4/2005 |
| DE | 10 2005 036 334 B4 | 1/2010 |

\* cited by examiner

*Primary Examiner* — Patrick F Brinson
(74) *Attorney, Agent, or Firm* — McGlew and Tuttle, P.C.

(57) ABSTRACT

The lining device is intended to line a sewer branch pipe with a lining tube. It includes a holding chamber for the lining tube, the holding chamber having a straight holding-chamber bearing line. Furthermore, it has a reduction piece which is attached to an end side of the holding chamber and has a straight reduction-piece bearing line, which is aligned with the holding-chamber bearing line. Moreover, it has a deflection piece which is provided with a blow-out connection piece for fastening one end of the lining tube to, wherein a position of the blow-out connection piece is settable and adaptable to the position of a junction of the sewer branch pipe leading into the main sewer. Furthermore, it has pressure application device in order to blow out a lining tube, present in the holding chamber and fastened to the blow-out connection piece.

17 Claims, 3 Drawing Sheets

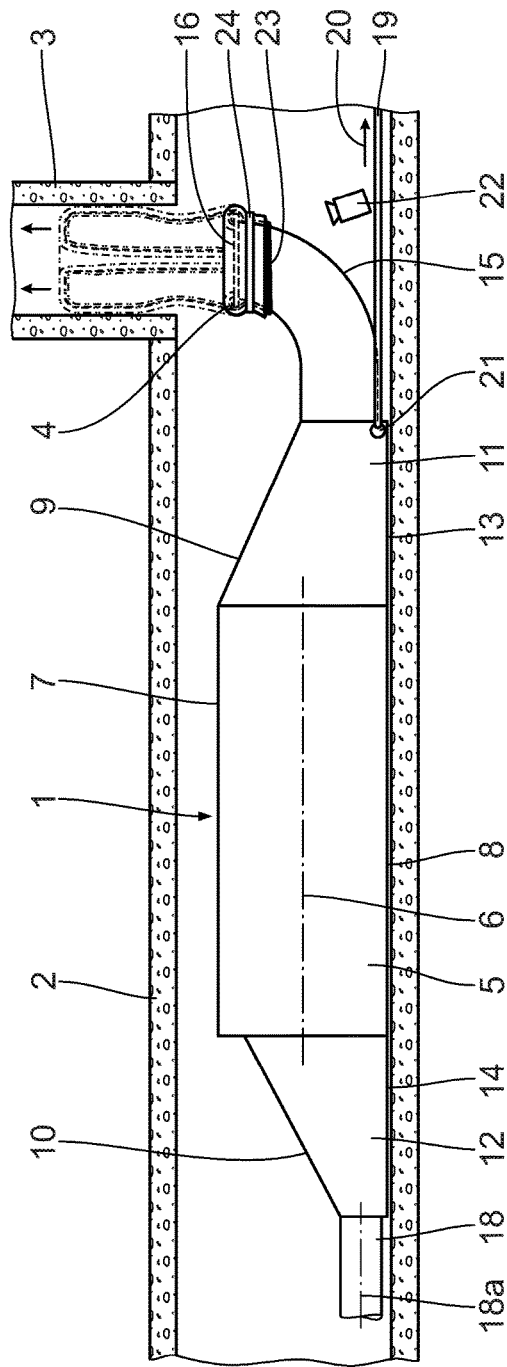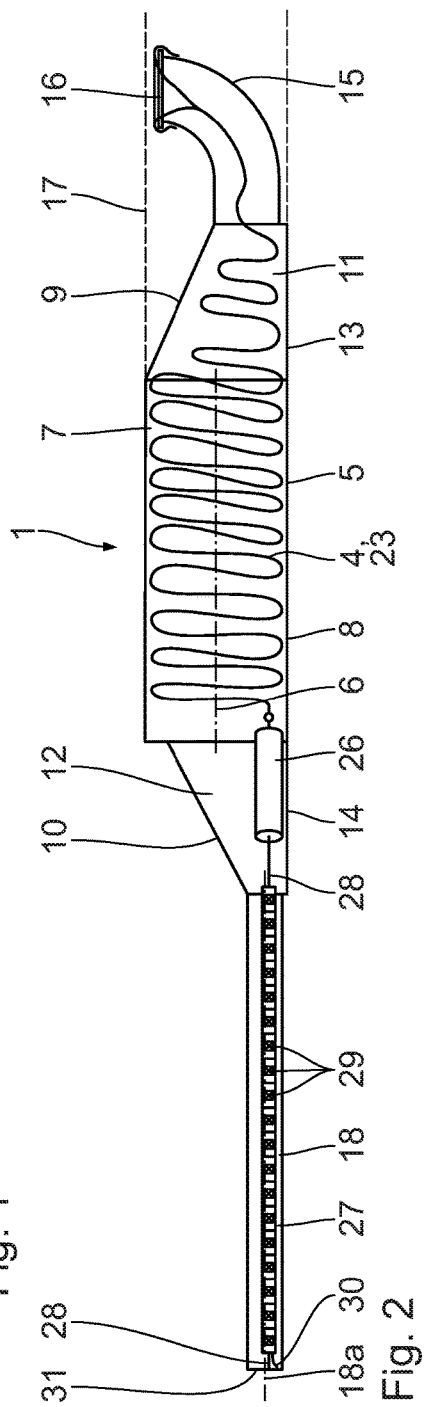
Fig. 1
Fig. 2

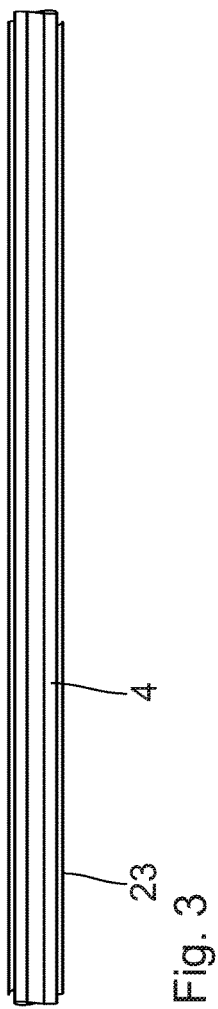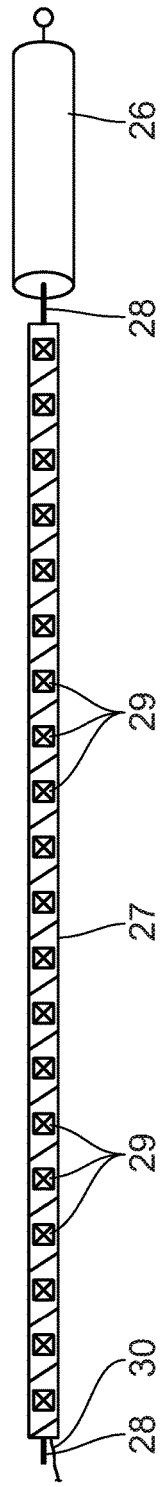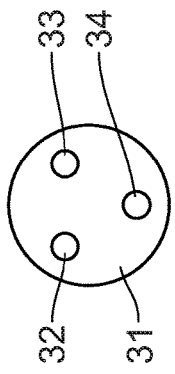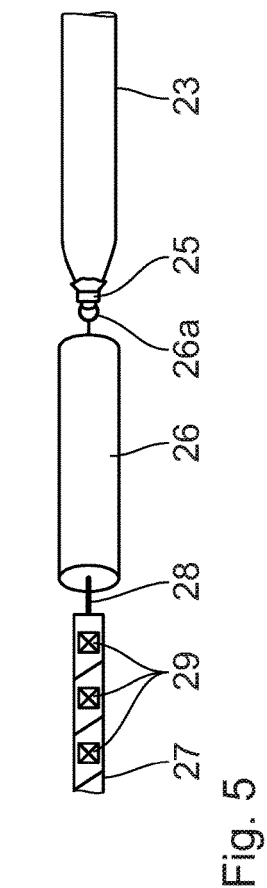
Fig. 3
Fig. 4
Fig. 5
Fig. 6

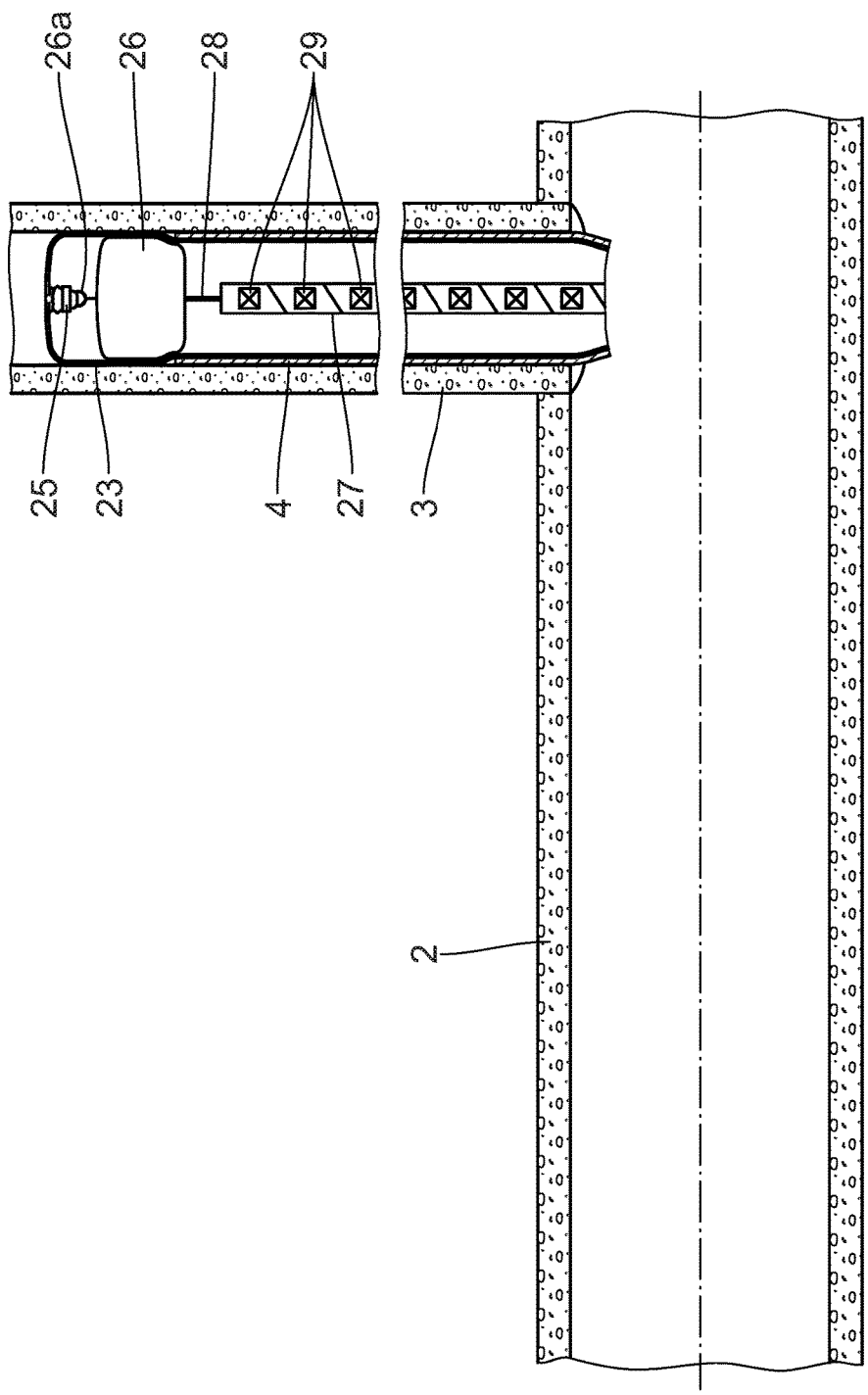

LINING DEVICE FOR LINING A SEWER BRANCH PIPE

CROSS-REFERENCES TO RELATED APPLICATIONS

This application claims the priority of German Patent Application, Serial No. 10 2016 209 246.4, filed May 27, 2016, pursuant to 35 U.S.C. 119(a)-(d), the content of which is incorporated herein by reference in its entirety as if fully set forth herein.

FIELD OF THE INVENTION

The invention relates to a lining device for lining a sewer branch pipe, branching off from a main sewer, with a lining tube. This lining device has a holding chamber for holding the lining tube.

BACKGROUND OF THE INVENTION

Lining devices and methods for renovating leaky or otherwise damaged pipelines, such as drains, are known, in which a lining tube is introduced into the faulty pipeline in order to repair the defective point. A lining tube used in this case is sometimes referred to as an inliner or just as a liner. It can be embodied as a textile hose impregnated with a curable synthetic resin. Once the lining tube introduced beforehand into the faulty pipeline has cured, there is a pipe-in-pipe structure, as a result of which the pipeline is functional again.

There are various methods and/or devices for introducing the lining tube. DE 10 2005 036 334 B4 describes one such device, which has a pressurizable holding chamber for the lining tube to be introduced, wherein the holding chamber is connected via an angled pipe section to a connection piece to which one end of the lining tube is fastened. That device is directly attached by way of the connection piece to a pipeline to be renovated in order to blow the lining tube out of the holding chamber by means of compressed air and into the pipeline to be renovated. The use of that device is limited to cases in which the pipeline to be renovated is accessible from the outside. However, it is unsuitable for the renovation of an inaccessible or only poorly accessible sewer branch pipe that branches off from a main sewer and has a smaller diameter than the main sewer.

The method described in DE 699 16 681 T2 and the associated device are also suitable for introducing a lining tube into such a sewer branch pipe with poor accessibility. The special lining tube used is provided, at the end which is intended to be positioned at the junction point of the sewer branch line, with a cured flange. In order to be transported to the junction point, the lining tube is accommodated in a pressure bag. Transport through the main sewer and the attachment of the flange to the junction point are brought about by a special sewer robot. This robot has a complicated structure. Its use is associated with a great deal of effort. Furthermore, the equipment of the lining tube with the positioning flange also implies not inconsiderable effort. This is unfavorable, since the effort required and also the costs associated therewith often represent a considerable deciding factor in sewer renovation.

In many municipalities and towns or cities, the drains up to the property boundary are communal property and also have to be maintained up to this boundary by the local authority. In order, in this connection, to avoid disagreements that not infrequently occur between the authorities and property owners, the drains that branch off toward the property are renovated from the main sewer. If the main sewer is not walkable, this represents a great technical challenge which can be mastered only with complicated apparatus, such as that described above, for example. The costs associated therewith can only be borne by local authorities with difficulty, if at all.

SUMMARY OF THE INVENTION

The object of the invention is to specify a lining device of the type mentioned at the beginning which has improved handling compared with the prior art.

In order to achieve this object, a lining device 1 is specified having a holding chamber which has a cylindrical geometry with an axis of rotation and a cylindrical holding-chamber outer circumferential surface, wherein the cylindrical holding-chamber outer circumferential surface has a straight holding-chamber bearing line which is parallel to the axis of rotation. Furthermore, the lining device has at least one first reduction piece which is attached to a first axial end side of the holding chamber and has a frustoconical geometry with a reduction-piece outer circumferential surface in the form of an oblique truncated cone, wherein a level line of this oblique truncated cone is located on the reduction-piece outer circumferential surface and forms a straight first reduction-piece bearing line which is aligned with the holding-chamber bearing line. Moreover, the lining device has a deflection piece which is attached to an axial side, away from the holding chamber, of the first reduction piece and which is provided, at an end away from the first reduction piece, with a blow-out connection piece for fastening one end of the lining tube to, in particular in a pressure-tight manner, wherein the connection between the first reduction piece and the deflection piece is configured such that a position of the blow-out connection piece is settable and adaptable to the position of a junction of the sewer branch pipe leading into the main sewer. Furthermore, the lining device has a pressure application means for applying a blow-out pressure to the unit configured in a pressure-tight manner and formed by the holding chamber, the at least first reduction piece and the deflection piece, in order to blow a lining tube, present in the holding chamber and fastened to the blow-out connection piece, out of the blow-out connection piece.

The lining device according to the invention is intended for the renovation of a sewer branch pipe that branches off from a main sewer that is in particular not walkable. It is distinguished by very easy and at the same time very efficient handling. Advantageously, in spite of possibly only poor accessibility of the sewer branch line via the main sewer, no complicated technical apparatus needs to be operated. Especially, it is not necessary to use a sewer robot. Thus, the effort required is much lower than in previously known lining devices and methods.

The essential advantage is that the lining device according to the invention can be fully equipped and set ready for operation readily either outside the sewer system or in an easily accessible part of the sewer system. Then, it can be moved to its working position at the junction point of the sewer branch pipe in a very uncomplicated manner, for example in that it is simply pulled through the main sewer by means of a pulling cable. On account of its special design, the lining device automatically reaches the junction point of the sewer branch pipe in the correct position. Specifically, the position of the blow-out connection piece can already be adapted in advance to the known conditions prevailing in the sewer system, in that the deflection piece is mounted appropriately on the first reduction piece. In particular, the deflection piece, preferably configured in the form of a pipe bend, can be rotated with respect to the first reduction piece until the blow-out connection piece of the deflection piece is in the correct position. In this position, the connection between the deflection piece and the first reduction piece is then in particular fixed. The pipe bend can have for example a deflection angle of between 45° and 90°, for example 45°, 67° or 90°.

The specially configured first reduction piece with the outer circumferential surface in the form of an oblique truncated cone results in particular in a favorably low-lying centre of gravity. In particular, the centre of gravity is located beneath the axis of rotation of the holding chamber. Preferably, as a result, the lining device virtually always rests against the inner wall of the main sewer in a defined manner with its bearing lines provided for this purpose, i.e. in particular the holding-chamber bearing line and the first reduction-piece bearing line aligned therewith. In particular, no tilting or twisting of the lining device, for example about the axis of rotation of the holding chamber, occurs while the lining device is being pulled through the main sewer to its point of use, or while it is working at the point of use.

Preferably, the deflection piece is attached directly to the first reduction piece. However, indirect attachment is also possible, in which at least one further component is arranged between the first reduction piece and the deflection piece, for example an extension piece or a further reduction piece, preferably configured in a similar manner to the first reduction piece, with the form of an oblique truncated cone.

Furthermore, the fastening of the lining tube to the blow-out connection piece can preferably be embodied directly. However, indirect fastening or attachment is also possible, in which the fastening of the lining tube to the blow-out connection piece takes place indirectly, for example by means of a film, in particular by means of a release-film tube.

A configuration is favorable in which the blow-out connection piece is located in any settable, and in particular also technically appropriate, position within a fictitious cylindrical space which is formed by an imaginary axial extension of the cylindrical holding-chamber outer circumferential surface. This prevents the blow-out connection piece from hitting the inner wall of the main sewer for example when the lining device is being pulled through the main sewer. Thus, the blow-out connection piece and also the inner wall of the main sewer are protected against damage.

According to a further favorable configuration, at least one fastening means for fastening a pulling cable is provided. In this way, the lining device can be moved very easily to its point of use at the junction point of the sewer branch pipe. For example, the fastening means can be a fastening eye which is attached to the lining device at a suitable point, in particular to a pipe clamp intended for connecting two components of the lining device. Alternatively, the pulling cable can also be fastened to the blow-out connection piece, for example in that it is simply placed around a flange of the blow-out connection piece.

According to a further favorable configuration, a second reduction piece is provided, which is attached to a second axial end side, away from the first reduction piece, of the holding chamber and likewise has a frustoconical geometry with a reduction-piece outer circumferential surface in the form of an oblique truncated cone, wherein a level line of this oblique truncated cone is located on the reduction-piece outer circumferential surface and forms a straight second reduction-piece bearing line which is aligned with the holding-chamber bearing line and thus in particular also with the first reduction-piece bearing line. As a result, the risk of the position of the lining device changing, in particular by tilting or twisting, while it is being pulled through the main sewer, is reduced further.

The same goes for a further favorable configuration, in which the second reduction piece is connected, on a side away from the holding chamber, to a stabilizing element which forms a continuation of the second reduction-piece bearing line and thus in particular also of the other two bearing lines, i.e. the holding-chamber bearing line and the first reduction-piece bearing line. The stabilizing element can also be in particular a control element. Preferably, the stabilizing element is hollow, such that feed lines can be guided through its interior or other components can be at least partially accommodated therein. In particular, the stabilizing element is pressure-tight. Thus, it can be part of a larger pressure-tight unit. Advantageously, the stabilizing element is flexible. This improves the ability to negotiate curves and makes it easier to make the lining device ready for operation in tight space conditions. The stabilizing device can be embodied as a pipe or as a tube. In both variants, the advantageous stabilizing action, namely the avoidance of tilting or twisting of the lining device, is provided.

According to a further favorable configuration, the lining tube is surrounded along its entire lining-tube length, in the state accommodated in the holding chamber, with an airtight release-film tube which is likewise fastened to the blow-out connection piece by way of its first tube end. In particular, the release-film tube is connected, at its second tube end away from the blow-out connection piece, to a sealing balloon that is able to be blown up. Preferably, the release-film tube is closed at the second tube end. Preferably, this closure is embodied in an airtight and pressure-tight manner. The airtight release-film tube, and in particular also the closure at the second tube end, makes it easier to blow the lining tube into the sewer branch pipe to be renovated, in that preferably a sealed-off interior that is formed by different components of the lining device and in particular also by the release-film tube, is subjected to positive pressure. Advantageously, the lining tube, in contrast to the release-film tube, is not closed at any end. As a result, it is possible to use the common available tube types for lining tubes. In addition, after curing has taken place, the need to reopen the lining tube forming the pipe-in-pipe, in order to ensure the desired channel flow, is dispensed with. Otherwise, a closure of the lining tube would have to be cut open, for example, and this would necessarily be associated with a degree of effort. When the lining tube has been introduced into the sewer branch pipe, it is favorable to press the lining tube, while it is curing, against the inner wall of the sewer branch pipe. This takes place preferably by means of pressure application, in particular the same pressure application which previously brought about the blowing or introducing of the lining tube into the sewer branch pipe. The sealing balloon is in particular intended to ensure the action of this pressure application during curing, specifically to have a pressure-tight interior and consequently a radially outwardly directed pressure force acting on the introduced lining tube.

According to a further favorable configuration, the lining tube is connected at one tube end to a lighting element. This connection can be configured in particular in a direct, but preferably also indirect, manner, for example via the release-film tube and/or the sealing balloon, wherein the lighting element can then be fastened to the sealing balloon, preferably on a side away from the release-film tube and/or from the lining tube. Thus, the lighting required for curing is introduced into the sewer branch pipe together with the lining tube. A separate work step does not arise for this, with the result that the total time required for sewer renovation is shortened. The lighting element is preferably approximately the same length as the lining tube and is equipped such that it can emit light everywhere in particular along this total length. Thus, after being introduced into the sewer branch pipe to be renovated, the lining tube can be cured simultaneously along its entire length in a single work step by means of the lighting element. Successive curing of in each case only one subsection of the lining tube with repeated relocation of the lighting element is advantageously not necessary. In this way, the total time required for renovation can be considerably reduced.

According to a further favorable configuration, the lighting element has an elongate carrier element to which a plurality of LEDs are attached. The LEDs are in particular arranged in a manner distributed in a longitudinal and circumferential direction. They are preferably UV LEDs. The carrier element is in particular flexible and for example hollow. It preferably has a round cross-sectional geometry. It can be configured for example as a carrier tube. With such a lighting element, a relatively long length of a lining tube introduced into the sewer branch pipe to be renovated can be cured in one work step. This contributes towards reducing the time requirement.

According to a further favorable configuration, the LEDs are UV cold LEDs which bring about a maximum temperature of 50° C. As a result, undesired shrinkage, which may occur at higher temperatures, of the lining tube after curing is avoided.

Further features, advantages and details of the invention can be gathered from the following description of exemplary embodiments with reference to the drawing.

BRIEF DESCRIPTION OF THE DRAWING

FIG. 1 shows an exemplary embodiment of a lining device, present in a main sewer, for introducing a lining tube into a sewer branch pipe off the main sewer, FIG. 2 shows the lining device according to FIG. 1 outside the main sewer and equipped with a lining tube and a sealing balloon and UV light string connected thereto, FIG. 3 shows a central detail of the lining tube surrounded by a release-film tube and to be accommodated in a holding chamber of the lining device according to FIGS. 1 and 2, FIG. 4 shows the sealing balloon and UV light string according to FIG. 2 in an enlarged illustration, FIG. 5 shows the connection of the release-film tube, according to FIG. 3, surrounding the lining tube to the sealing balloon and the UV light string according to FIGS. 2 and 4, FIG. 6 shows a closure element of a stabilizing tube present at one end of the lining device according to FIGS. 1 and 2, and FIG. 7 shows the lining tube, introduced fully into the sewer branch pipe, with the sealing balloon inflated and the UV light string in its lighting position.

DESCRIPTION OF THE PREFERRED EMBODIMENTS

Mutually corresponding parts are provided with the same reference signs in FIGS. 1 to 7. In addition, details of the exemplary embodiments explained in more detail in the following text can represent an invention per se or be part of a subject of the invention.

FIGS. 1 and 2 show an exemplary embodiment of a lining device 1 for lining, with a lining tube 4, a sewer branch pipe 3 that is to be renovated and branches off from a main sewer pipe 2.

The illustration according to FIG. 1 shows a state in which the lining device 1 is in its working position within the main sewer pipe 2, which is in particular not walkable, at the junction of the sewer branch pipe 3, such that the lining tube 4 can be introduced into the sewer branch pipe 3 to be renovated. The introduction of the lining tube 4 is indicated by the dot-dashed lines.

FIG. 2 shows, by contrast, the lining device 1 outside the main sewer pipe 2 but in a state equipped ready for use. The equipping of the lining device 1 is indicated in FIG. 2 in that the components located inside the lining device 1, inter alia the lining tube 4, are also illustrated.

The lining device 1 comprises a cylindrical holding chamber 5, within which the lining tube 4 is accommodated in a concertinaed and thus very space-saving manner. According to the cylindrical geometry, the holding chamber 5 has an axis of rotation 6 (see FIG. 2) and a cylindrical outer circumferential surface 7. The holding chamber 5 rests, at least with a holding-chamber bearing line 8, against a likewise cylindrical inner wall of the main sewer pipe 2. The holding-chamber bearing line 8 is a straight line and part of the cylindrical outer circumferential surface 7. It extends parallel to the axis of rotation 6.

Attached to each of the two axial end sides of the holding chamber 5 is a reduction piece 9, 10. The attachment can be configured in each case in particular in an exchangeable manner. In this case, the term "axial" relates in each case to the axis of rotation 6, which also defines the main longitudinal direction of the lining device 1 and which is oriented substantially parallel to a direction of flow through the main sewer pipe 2 in the operating state, shown in FIG. 1, of the lining device 1. The two reduction pieces 9, 10 each have a frustoconical geometry. Their outer circumferential surfaces 11, 12 are each in the form of an oblique truncated cone, wherein the level line of the frustoconical geometry is located in each case on the outer circumferential surface 11, 12 in question and forms a reduction-piece bearing line 13, 14 there. The two reduction-piece bearing lines 13, 14 are also straight lines. They are aligned with the holding-chamber bearing line 8. The two reduction-piece bearing lines 13, 14 and the holding-chamber bearing line 8 are thus three partial bearing lines which together form a composite bearing line by means of which the three components of the lining device 1, i.e. the holding chamber 5 and the two reduction pieces 9, 10 arranged thereon, rest against the cylindrical inner wall of the main sewer pipe 2.

On the axial end side, away from the holding chamber 5, of the first reduction piece 9, a deflection piece 15 in the form of a pipe bend is attached to said first reduction piece 9. At an end away from the reduction piece 9, the deflection piece has a blow-out connection piece 16. The deflection piece 15 substantially represents a 90°-deflection in the exemplary embodiment shown. In alternative configurations, it is also possible for there to be other deflection angles, for example with any desired value from the range between 45° and 90°. The connection between the first reduction piece 9 and the deflection piece 15 is firm but releasable. In the partially released state, the deflection piece 15 can be twisted relative to the reduction piece 9, in particular about an axis of rotation (not drawn separately in FIGS. 1 and 2), which is oriented parallel to the axis of rotation 6. As a result of the corresponding twisting of the deflection piece 15, the blow-out connection piece 16 can be oriented such that—at least when the lining device 1 has been positioned correctly in the direction of flow through the main sewer pipe 2—it faces the junction point of the sewer branch pipe 3. After corresponding setting of the twisted position of the deflection piece 15, the connection between the reduction piece 9 and the deflection piece 15 is fixed. This setting takes place in particular while still outside the main sewer pipe 2, but with the position of the junction point of the sewer branch pipe 3 to be renovated being known.

In each settable twisted position for the deflection piece 15, the blow-out connection piece 16 is located within a fictitious cylindrical envelope 17 (see FIG. 2), which represents an extension of the cylindrical outer circumferential surface 7 of the holding chamber 5 in the axial direction, i.e. in the direction of the axis of rotation 6. As a result, the blow-out connection piece 16 does not hit the inner wall of the main sewer pipe 2 while the lining device 1 is being pulled through the latter. As a result, damage to the blow-out connection piece 16 and also to the inner wall of the main sewer pipe 2 is avoided.

The second reduction piece 10, attached on the other axial end side of the holding chamber 5, serves in particular also for the connection of a stabilizing tube 18 which represents an extension of the two reduction-piece bearing lines 13, 14 and of the holding-chamber bearing line 8. The stabilizing tube 18 is optional and intended in particular to rest on the cylindrical inner wall of the main sewer pipe 2 with a part of its outer tube circumference. The stabilizing tube 18 is preferably attached to the second reduction piece such that, with the stabilizing tube 18 designed in a straight manner, its longitudinal tube axis 18a is oriented parallel to the axis of rotation 6 of the holding chamber 5 but is not coincident therewith. In particular, the longitudinal tube axis 18a is located or extends in the intermediate space between the (extended) axis of rotation 6 and the (extended) holding-chamber bearing line 8. In contrast to the holding chamber 5, the two reduction pieces 9, 10 and the deflection piece 15, which preferably consist of a solid material, for example a metal, preferably a steel material, the stabilizing tube 18 has a degree of flexibility. It is hollow and consists for example of a rubber material.

In order to move the lining device 1 into the operating position, shown in FIG. 1, within the main sewer pipe 2, with the blow-out connection piece 16 in a position facing the junction point of the sewer branch pipe 3, the lining device 1 is pulled along in the main sewer pipe 2 by means of a pulling cable 19. This takes place in the pulling direction 20. In order to fasten the pulling cable 19 to the lining device 1, at least one fastening means is provided. In the exemplary embodiment, this is a fastening eye 21 attached to a pipe clamp (not shown) provided for connecting the reduction piece 9 and the deflection piece 15. The pulling of the lining device 1 into the main sewer pipe 2 is monitored by means of a camera 22 likewise introduced into the main sewer pipe 2. As soon as the camera monitoring establishes that the blow-out connection piece 16 is at the junction point of the sewer branch pipe 3, the pulling movement of the lining device 1 is stopped, in order then to start with the introduction of the lining tube 4 into the sewer branch pipe 3 to be renovated.

The favorable geometry of the lining device 1, and in particular of the reduction pieces 9, 10, ensures that, during the pulling movement within the main sewer pipe 2, no tilting or twisting of the lining device 1 about the axis of rotation 6 takes place. On account of the frustoconical shape of the reduction pieces 9, 10, the centre of gravity of the lining device 1 is advantageously below the axis of rotation 6. As a result, the position is stabilized such that the lining device 1 always rests against the inner wall of the main sewer pipe 2 by means of the three bearing lines 8, 13 and 14 during the pulling movement within the main sewer pipe 2. In addition, the stabilizing tube 8 preferably also supports the maintaining of this position. These stabilizing measures ensure that the blow-out connection piece 16 is moved into its operating position in a correct position. In particular, the blow-out connection piece 16 is prevented from coming to rest in a position not facing the junction point of the branch sewer pipe 3 to be renovated on account of tilting or twisting of the lining device 1 while it is being pulled into the main sewer pipe 2. These stabilizing measures are not only very simple but also nevertheless extremely effective. Advantageously, it is possible to dispense with the considerably more complicated use of a robot.

The lining tube 4 is embodied for example as a laminate or inliner. The laminate can have or at least contain for example a glass fiber fabric. The inliner can consist for example of a needle felt, of a knitted stocking, or velour or of some other absorbent material. Furthermore, the lining tube 1 is impregnated, in particular at the factory, with a curing agent, for example a synthetic resin.

As can be seen from FIG. 3, the lining tube 4 is in each case surrounded with an airtight release-film tube 23 while it is being stored within the holding chamber 5. In the exemplary embodiment shown, the release-film tube 23 consists of a polyethylene (PE) film which does not exhibit any or at most little extensibility. One end of the combined unit made up of the lining tube 4 and the surrounding release-film tube 23 is fixed to the blow-out connection piece 16. For example, this end can be wrapped around the blow-out connection piece 16 equipped in particular with a flange. Preferably, the wrapped end can then be fixed to the outside of the blow-out connection piece 16, for example by means of a clamping ring 24. The fixing can in this case take place in particular both for the lining tube 4 and for the release-film tube 23 (see FIG. 1). In an alternative configuration that is not shown, only the release-film tube 23 is fastened to the blow-out connection piece 16. In this alternative configuration, the release-film tube 23 protrudes a little beyond that end of the lining tube 4 that faces the junction point of the sewer branch pipe 3. Fastening to the blow-out connection piece 16 takes place by way of this protruding end.

According to FIG. 2, the unit made up of the lining tube 4 and release-film tube 23 is connected, at its end away from the blow-out connection piece 16, to further components, namely to a sealing balloon 26 and an elongate lighting element 27. At this end, the release-film tube 23 is closed in an airtight manner. This closure takes place preferably in the manner of the connection to the sealing balloon 26, which is equipped at its relevant one end with a connecting eye 26a. The tube end of the release-film tube 23 is passed through this connecting eye 26a and folded back. The folded-back tube end is fixed for example to the outside of the release-film tube 23 by means of a suitable fixing means 24, so as to result, overall, in both the connection to the sealing balloon 26 and the airtight closure of the release-film tube 23. A suitable fixing means 25 is for example an adhesive tape, a cable tie, a hook-and-loop closure or the like. At the end of the sealing balloon 26 away from the release-film tube 23, there is a further connection between the lighting element 27 and the sealing balloon 26, which is realized by a compressed-air feed tube 28 in the exemplary embodiment.

The lighting element 27 has a hollow carrier tube (not shown in more detail), which is pushed over the compressed-air feed tube 28. On this carrier tube, a multiplicity of UV LEDs 29 are arranged in a manner distributed in particular regularly in the longitudinal and circumferential direction of the carrier tube. The UV LEDs 29 are cold LEDs which bring about a maximum temperature of 50° C., this being favorable with regard to the curing of the lining tube 4. This is because higher curing temperatures can lead to an undesired shrinking process. The UV LEDs 29 are supplied with the electrical energy necessary for light operation via an electrical supply cable 30.

The lighting element 27 with the carrier tube and the UV LEDs 29 arranged thereon can be understood as a UV cold light LED string or only as a UV light string.

The stabilizing tube 18 can hold at least part of the elongate lighting element 27 in its cavity (see FIG. 2). The hollow stabilizing tube 18 is closed in a pressure-tight manner at its outer end by a closure cover 31 that is shown in an enlarged manner in FIG. 6. The closure cover 31 has a plurality of feed line connections, specifically, inter alia, a first compressed-air connection 32, by means of which compressed air can be applied to the interiors, connected together in a pressure-tight manner, of the stabilizing tube 18, of the reduction piece 10, of the holding chamber 5, of the reduction piece 9 and of the deflection piece 15. The first compressed-air connection 32 is, in this respect, a pressure application means by means of which a positive pressure of in particular 0.3 to 0.5 bar can be set. As explained in the following text, this positive pressure can also be understood as a blow-out pressure. The unit made up of the stabilizing tube 18, the two reduction pieces 9, 10, the holding chamber 5 and the deflection piece 15, including the fixed combined arrangement, wrapped around the blow-out connection piece 16, made up of the lining tube 4 and the airtight release-film tube 23, is embodied in particular in a pressure-tight manner, such that this unit tends to increase its internal volume in the event of compressed-air application via the compressed-air connection 32. This takes place in that the combined unit made up of the lining tube 4 and the release-film tube 23 expands into the sewer branch pipe 3. In the process, the arrangement made up of the lining tube 4 and release-film tube 23 is turned or inverted. It turns inside out. The lining tube 4 arranged within the release-film tube 23 in the state stored within the holding chamber 4 comes to lie on the outside, i.e. to rest against an inner wall of the sewer branch pipe 3, in the turned state in the sewer branch pipe 3, whereas the release-film tube 23 is arranged on the inner side of the lining tube 3 and thus away from the inner wall of the sewer branch pipe 3. The start of the introduction of the lining tube 4 into the sewer branch pipe 3, which can also be understood as blowing in or out, is indicated in FIG. 1 by the dot-dashed lines.

The closure cover 31 furthermore has a second compressed-air connection 33, which is connected to the compressed-air feed tube 23 on an inner side of the cover. The second compressed-air connection 33 serves to apply pressure to the sealing balloon 26 attached to the compressed-air feed tube 28.

Furthermore, an electrical connection 34 is provided on the closure cover 31, said electrical connection 34 being connected to the electrical supply cable 30 on the inner side of the cover. By means of the electrical connection 34, the electrical energy required for operating the UV LEDs 29 is supplied.

FIG. 7 shows the state with the lining tube 4 introduced fully into the sewer branch pipe 3. The end of the release-film tube 23 extends somewhat further into the sewer branch pipe 3 than the lining tube 4. This end of the release-film tube 23 is closed. On account of the lack of support by a sewer inner wall there, the release-film tube 23 can burst at its closed end under the action of the positive pressure, although this does not have to take place.

The sealing balloon 26 fastened to the closed end of the release-film tube 23 is pressurized by means of the compressed-air feed tube 28 and the second compressed-air connection 33. The sealing balloon 26 can consist of an elastic rubber material or a likewise elastic silicone material. It expands under the influence of the pressure application, such that sealing takes place at the end of that portion of the sewer branch pipe 3 that is to be renovated, specifically regardless of whether the release-film tube 23 has burst at its closed end or not.

On account of the positive pressure that continues to be supplied via the first compressed-air connection 32, the lining tube 4 is pressed, by the release-film tube 23 that is intact in any case within the sewer branch pipe 3, against the inner wall of the sewer branch pipe 3 to be renovated. The inflated sealing balloon 26 ensures an interior that is sufficiently pressure-tight for this purpose and extends from the closure cover 31 on the stabilizing tube to the sealing balloon 26.

In order to cure the lining tube 4 impregnated with the curing agent, the UV LEDs 29 are supplied with energy via the electrical connection 34 and the electrical supply cable 30. Since the lighting element 27 is approximately the same length as the lining tube 4, the curing of the lining tube 4 advantageously takes place simultaneously in a single work step along its entire tube length. After a lighting time of about 30 to 60 minutes, the curing operation is concluded. The lining tube 4 then forms an intact water-tight inner coating for the sewer branch pipe 3, which is thus renovated and fully functional again.

Following depressurization via the two compressed-air connections 32 and 33, the sealing balloon 26, the lighting element 27 and also the release-film tube 23 can be pulled out of the renovated sewer branch pipe 3. After the fixing of the lining tube 4 and of the release-film tube 23 to the blow-out connection piece 16 has been released, the lining device 1 can also be pulled out of the main sewer pipe 2. Advantageously, following the conclusion of the renovation, it is not necessary for any cured closure plug to be cut out by means of a cutting robot in order to allow water to flow through the sewer branch pipe 3 again, as is necessary in many of the existing lining devices and/or methods.

Alternative configurations are also conceivable in which, for example, no lighting element 27 is provided. The curing of the lining tube 4 impregnated with the curing agent then takes place for example thermally via the ambient temperature. To this end, the lining tube 4 can be cooled while it is being stored in the holding chamber 5, in particular by cooling water that washes around the holding chamber 5, until it is blown into the sewer branch pipe 3 to be renovated. The curing reaction, brought about in particular thermally, of the curing agent preferably only starts when the lining tube 4 has left the cooled region.

Likewise, an alternative configuration is conceivable in which no sealing balloon 26 is used. In this case, the closed end, also intact in that case, of the airtight release-film tube 23 ensures that there is a sufficiently pressure-tight interior in order to press the lining tube 4 against the inner wall of the sewer branch pipe 3 to be renovated.

In any case, by means of the lining device 1 and also the alternative configurations thereof, a faulty sewer branch pipe 3 can be renovated very easily and very efficiently. In particular, no complicated equipment, for example robots, is necessary for the renovation.

What is claimed is:

1. A lining device for lining a sewer branch pipe, branching off from a main sewer, with a lining tube, the lining device comprising:
   a holding chamber for holding the lining tube, wherein the holding chamber has a cylindrical geometry with an axis of rotation and a cylindrical holding-chamber outer circumferential surface, and the cylindrical holding-chamber outer circumferential surface has a straight holding-chamber bearing line which is parallel to the axis of rotation;
   at least one first reduction piece which is attached to a first axial end side of the holding chamber and has a frustoconical geometry with a reduction-piece outer circumferential surface in the form of an oblique truncated cone, wherein a level line of the oblique truncated cone is located on the reduction-piece outer circumferential surface and forms a straight first reduction-piece bearing line which is aligned with the holding-chamber bearing line;
   a deflection piece which is attached to an axial side, away from the holding chamber, of the first reduction piece and which is provided, at an end away from the first reduction piece, with a blow-out connection piece for fastening one end of the lining tube to, wherein the connection between the first reduction piece and the deflection piece is configured such that a position of the blow-out connection piece is settable and adaptable to the position of a junction of the sewer branch pipe leading into the main sewer; and
   a pressure application means for applying a blow-out pressure to the device configured in a pressure-tight manner and formed by the holding chamber, the at least first reduction piece and the deflection piece, in order to blow a lining tube, present in the holding chamber and fastened to the blow-out connection piece, out of the blow-out connection piece, wherein a second reduction piece is provided, which is attached to a second axial end side, away from the first reduction piece, of the holding chamber and likewise has a frustoconical geometry with a reduction-piece outer circumferential surface in the form of an oblique truncated cone, wherein a level line of this oblique truncated cone is located on the reduction-piece outer circumferential surface and forms a straight second reduction-piece bearing line which is aligned with the holding-chamber bearing line, the second reduction piece being connected, on a side away from the holding chamber, to a stabilizing element which forms a continuation of the second reduction-piece bearing line, the stabilizing element being hollow, the stabilizing element holding at least a part of an elongate lighting element.

2. A lining device according to claim 1, wherein the blow-out connection piece is located in any settable position within a fictitious cylindrical space which is formed by an imaginary axial extension of the cylindrical holding-chamber outer circumferential surface.

3. A lining device according to claim 1, wherein at least one fastening means for fastening a pulling cable is provided.

4. A lining device according to claim 1, wherein the stabilizing element is flexible.

5. A lining device according to claim 1, wherein the lining tube is surrounded along its entire lining-tube length, in the state accommodated in the holding chamber, with an airtight release-film tube which is likewise fastened to the blow-out connection piece by way of its first tube end.

6. A lining device according to claim 5, wherein the release-film tube is connected, at its second tube end away from the blow-out connection piece, to a sealing balloon that is able to be blown up.

7. A lining device according to claim 5, wherein the release-film tube is closed at its second tube end away from the blow-out connection piece.

8. A lining device according to claim 1, wherein the lining tube is connected at one tube end to the lighting element.

9. A lining device according to claim 8, wherein the lighting element has an elongate carrier element to which a plurality of LEDs are attached.

10. A lining device according to claim 9, wherein the LEDs are UV cold LEDs which bring about a maximum temperature of 50° C.

11. A lining device for lining a sewer branch pipe, branching off from a main sewer, with a lining tube, the lining device comprising:
   a holding chamber for holding the lining tube, wherein the holding chamber has a cylindrical geometry with an axis of rotation and a cylindrical holding-chamber outer circumferential surface, and the cylindrical holding-chamber outer circumferential surface has a straight holding-chamber bearing line which is parallel to the axis of rotation;
   at least one first reduction piece which is attached to a first axial end side of the holding chamber and has a frustoconical geometry with a reduction-piece outer circumferential surface in the form of an oblique truncated cone, wherein a level line of the oblique truncated cone is located on the reduction-piece outer circumferential surface and forms a straight first reduction-piece bearing line which is aligned with the holding-chamber bearing line;
   a deflection piece which is attached to an axial side, away from the holding chamber, of the first reduction piece and which is provided, at an end away from the first reduction piece, with a blow-out connection piece for fastening one end of the lining tube to, wherein the connection between the first reduction piece and the deflection piece is configured such that a position of the blow-out connection piece is settable and adaptable to the position of a junction of the sewer branch pipe leading into the main sewer; and
   a pressure application means for applying a blow-out pressure to the device configured in a pressure-tight manner and formed by the holding chamber, the at least first reduction piece and the deflection piece, in order to blow a lining tube, present in the holding chamber and fastened to the blow-out connection piece, out of the blow-out connection piece, wherein a second reduction piece is provided, which is attached to a second axial end side, away from the first reduction piece, of the holding chamber and likewise has a frustoconical geometry with a reduction-piece outer circumferential surface in the form of an oblique truncated cone, wherein a level line of this oblique truncated cone is located on the reduction-piece outer circumferential surface and forms a straight second reduction-piece bearing line which is aligned with the holding-chamber bearing line.

12. A lining device according to claim 11, wherein the second reduction piece is connected, on a side away from the holding chamber, to a stabilizing element which forms a continuation of the second reduction-piece bearing line.

13. A lining device according to claim 12, wherein the stabilizing element is hollow.

14. A lining device according to claim 12, wherein the stabilizing element is flexible.

15. A lining device for lining a sewer branch pipe, branching off from a main sewer, with a lining tube, the lining device comprising:
- a holding chamber for holding the lining tube, wherein the holding chamber has a cylindrical geometry with an axis of rotation and a cylindrical holding-chamber outer circumferential surface, and the cylindrical holding-chamber outer circumferential surface has a straight holding-chamber bearing line which is parallel to the axis of rotation;
- at least one first reduction piece which is attached to a first axial end side of the holding chamber and has a frustoconical geometry with a reduction-piece outer circumferential surface in the form of an oblique truncated cone, wherein a level line of the oblique truncated cone is located on the reduction-piece outer circumferential surface and forms a straight first reduction-piece bearing line which is aligned with the holding-chamber bearing line;
- a deflection piece which is attached to an axial side, away from the holding chamber, of the first reduction piece and which is provided, at an end away from the first reduction piece, with a blow-out connection piece for fastening one end of the lining tube to, wherein the connection between the first reduction piece and the deflection piece is configured such that a position of the blow-out connection piece is settable and adaptable to the position of a junction of the sewer branch pipe leading into the main sewer; and
- a pressure application means for applying a blow-out pressure to the device configured in a pressure-tight manner and formed by the holding chamber, the at least first reduction piece and the deflection piece, in order to blow a lining tube, present in the holding chamber and fastened to the blow-out connection piece, out of the blow-out connection piece, wherein the lining tube is connected at one tube end to a lighting element.

16. A lining device according to claim 15, wherein the lighting element has an elongate carrier element to which a plurality of LEDs are attached.

17. A lining device according to claim 16, wherein the LEDs are UV cold LEDs which bring about a maximum temperature of 50° C.

* * * * *